March 31, 1925.
G. MERLE, SR
CRAB TRAP
Filed July 18, 1923
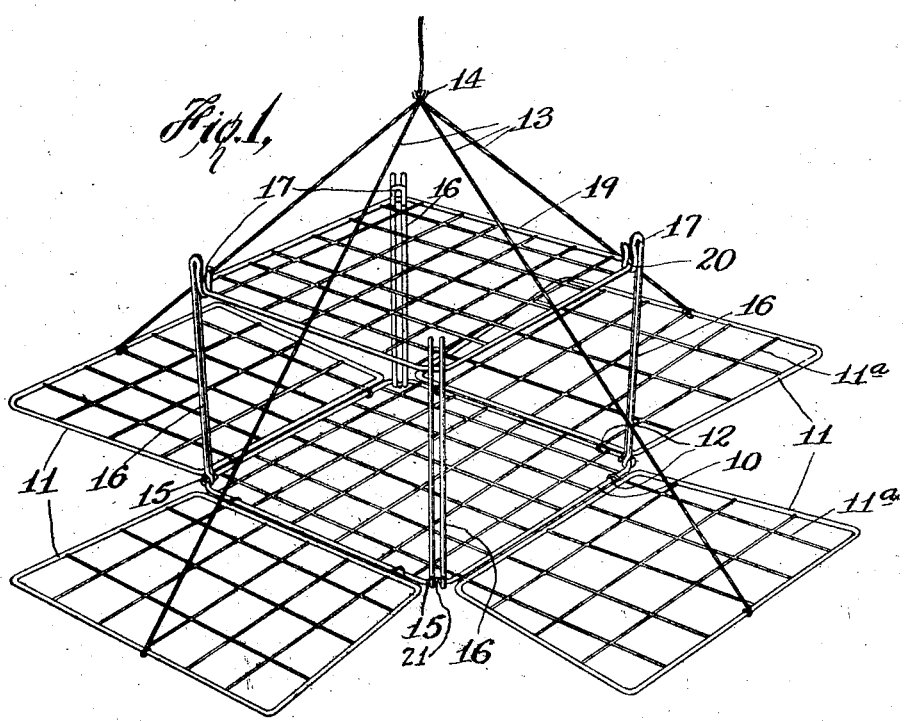
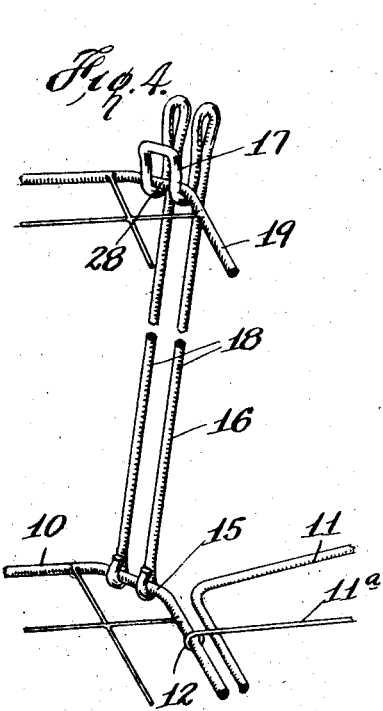
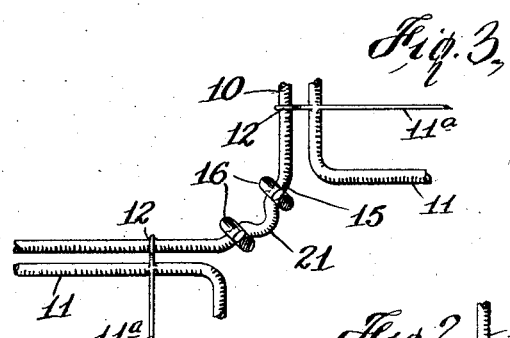
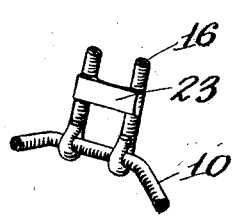
INVENTOR
George Merle, Sr.
BY
Edgar Tate
ATTORNEYS Patented Mar. 31, 1925.

1,531,300

UNITED STATES PATENT OFFICE.

GEORGE MERLE, SR., OF BROOKLYN, NEW YORK.

CRAB TRAP.

Application filed July 18, 1923. Serial No. 652,247.

*To all whom it may concern:*

Be it known that I, GEORGE MERLE, Sr., a citizen of the United States, and residing at Brooklyn, in the county of Kings and State of New York, have invented certain new and useful Improvements in Crab Traps, of which the following is a specification, such as will enable those skilled in the art to which it appertains to make and use the same.

This invention relates to crab traps and particularly to collapsible traps of this class; and the object of the invention is to provide improved means for supporting the separate parts of the trap in an extended and operative position, said means rendering the trap strong and durable; a further object being to provide a supporting means of the class specified, which is formed integral with or movably fixed to predetermined portions of the trap and foldable thereon, whereby the entire trap may be compactly folded together for shipment or other purposes; and with these and other objects in view, the invention consists in a device of the class and for the purpose specified which is simple in construction, efficient in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a perspective view of a crab trap made according to my invention with the parts in an extended, operative position.

Fig. 2 is a sectional plan view of one corner portion of the trap as shown in Fig. 1.

Fig. 3 is a view similar to Fig. 2 but showing a modification.

Fig. 4 is a perspective detail view of one corner portion of the trap and showing a modification; and Fig. 5 is a view similar to Fig. 2 but showing only a part of the construction and showing a modification.

My improved trap comprises, in the construction shown, a rectangular bottom section 10 to the sides of which are movably connected or hinged side sections 11 which preferably flare outwardly as clearly shown in the drawing.

The side sections 11 are connected with the side members of the bottom section 10 by the extension of two or more of the rods 11ª of the side sections 11 and looping the same around the sides of the bottom section 10 as clearly shown at 12 in Fig. 2 of the drawing, and attached centrally of the free edges of the side sections 11 are cords or wires 13 which are joined together as shown at 14 in the usual manner.

The corner portions of the bottom section 10 of the trap are bent at an angle of approximately 45 degrees to the side members of said section to form flattened or angularly arranged bearing portions 15 which are kinked or bent centrally as shown at 21 and a plurality of stanchion rods 16 are pivotally mounted in connection with the bearing portions 15 as clearly shown. In the construction shown, the rods 16 are each fashioned from a single piece of wire bent centrally to form a spring yoke-shaped hook member 17 and independent rod members 18 which are looped around the bearing portions 15 at the opposite sides of the kinks 21 to pivot the same in connection therewith. The spring hook members 17, when the trap is in use, are directed upwardly and are adapted to receive and support a top section 19 of slightly greater dimensions than the bottom section 10, and having angular bearing portions 20 in connection with which the hook members 17 operate.

When the trap is in a knocked down position, the rods 16 are folded inwardly upon the top of the bottom section 10, after the top section 19 has been detached therefrom, and the side sections 11 are folded upon the top and bottom faces of the bottom section 10, thus forming a compact, rectangular package upon which the detached top section may be placed.

In order to prevent the movement of the end portions of the rod members 18 of the separate stanchion rods 16, I provide the kink or bend 21 in the central portion of the bearing portions 15 as above set out and these members 21 are bent outwardly in Figs. 1 and 2 of the drawing or inwardly as shown at 22 in Fig. 3 of the drawing, or the same result may be accomplished by simply soldering or welding a metal strip 23 onto the rod members 18 adjacent to the pivoted ends thereof as shown in Fig. 5 of the drawing.

In Fig. 5 of the drawing, it will be noted that the kinked or bent portions 21—22 are not employed, it being understood that this construction is not absolutely necessary as the rod members 18 of the standards are held in spaced relation by the angular bearing portions 15, at least against separation, and it will be understood that I am not necessarily limited to any specific manner of retaining said standards or the separate rods thereof in position.

The distinctive features of my invention reside in the formation of the stanchion rods 16 and the mounting of said rods in connection with the bottom section 10 of the trap together with the specific means of mounting the side sections 11 in connection with the trap whereby a strong and durable pivotal connection is provided between the side sections and the bottom section, and while I have shown certain details of construction for carrying my invention into effect, it will be apparent that I am not necessarily limited to these details and various changes therein and modifications thereof may be made within the scope of the appended claims without departing from the spirit of my invention or sacrificing its advantages.

Having fully described my invention, what I claim as new and desire to secure by Letters Patent, is:—

1. In a trap of the class described comprising a bottom section, side sections movably mounted in connection with the bottom section, and a top section independent of said bottom and side sections, four standards each of which are composed of a rod fashioned to form rod members extending in substantially parallel relation, one end of said rod members being looped around the bottom section to pivot said standards in connection therewith, the other ends of said rod members being fashioned to form spring hook members adapted to receive and support said top section in spaced relation with said bottom section, the corner portions of the top and bottom sections having bearing portions arranged at an angle to the contour of said sections, and means for holding the rod members of the standards in spaced relation where they are joined to the bottom section.

2. In a trap of the class described comprising a bottom section, side sections movably mounted in connection with the bottom section and a top section independent of said bottom and side sections, a plurality of standards composed of a rod fashioned to form rod members extending in substantially parallel relation, one end of said rod members being looped around the bottom section to pivot said standards in connection therewith, the other ends of said rod members being fashioned to form spring hook members adapted to receive and support said top section in spaced relation with said bottom section and said bottom section being fashioned to retain the rod members of the separate standards in predetermined spaced relation.

3. A trap of the class described comprising a bottom section, side sections movably mounted in connection with the bottom section, a top section independent of said bottom and side sections, the corner portions of said top and bottom sections being flattened, standards pivotally mounted in connection with the corner portions of the bottom section and detachably mounted in connection with the corner portions of the top section, said standards being each composed of a rod fashioned to form rod members extending in substantially parallel relation, one end of said rod members being looped around the flattened corner portions of the bottom section in spaced relation and the other ends of said rod members being fashioned to form spring hook members adapted to receive the flattened corner portions of the top section to rigidly support said sections in spaced relation.

In testimony that I claim the foregoing as my invention I have signed my name this 12th day of July, 1923.

GEORGE MERLE, Sr.